(12) United States Patent
Piesker

(10) Patent No.: US 9,309,000 B2
(45) Date of Patent: Apr. 12, 2016

(54) HEAT EXCHANGER FOR THE OUTER SKIN OF AN AIRCRAFT

(75) Inventor: Markus Piesker, Lueneburg (DE)

(73) Assignee: Airbus Operations GmbH (DE)

(*) Notice: Subject to any disclaimer, the term of this patent is extended or adjusted under 35 U.S.C. 154(b) by 1015 days.

(21) Appl. No.: 13/056,509

(22) PCT Filed: Jul. 27, 2009

(86) PCT No.: PCT/EP2009/059665
§ 371 (c)(1),
(2), (4) Date: Apr. 1, 2011

(87) PCT Pub. No.: WO2010/012684
PCT Pub. Date: Feb. 4, 2010

(65) Prior Publication Data
US 2011/0186263 A1   Aug. 4, 2011

Related U.S. Application Data

(60) Provisional application No. 61/137,472, filed on Jul. 31, 2008.

(30) Foreign Application Priority Data

Jul. 31, 2008  (DE) .......................... 10 2008 035 823

(51) Int. Cl.
*B64D 13/06* (2006.01)
*B64D 13/00* (2006.01)
*F28F 3/12* (2006.01)
(Continued)

(52) U.S. Cl.
CPC ................ *B64D 13/06* (2013.01); *B64D 13/00* (2013.01); *F28F 1/00* (2013.01); *F28F 3/12* (2013.01); *B64D 2013/0607* (2013.01); *F28D 2021/0021* (2013.01); *Y02T 50/44* (2013.01); *Y02T 50/56* (2013.01)

(58) Field of Classification Search
CPC .... F28F 7/00; B64D 2013/0607; B64D 13/06
USPC ...... 165/41, 44; 244/57, 134 E, 117 A, 134 R, 244/134 B
See application file for complete search history.

(56) References Cited

U.S. PATENT DOCUMENTS 2,168,166 A * 8/1939 Larrecq ............................ 244/57
2,171,047 A * 8/1939 Richardson et al. ............ 244/57
(Continued)

FOREIGN PATENT DOCUMENTS

CN           1902454 A       1/2007
CN        101228409 A       7/2008
(Continued)

*Primary Examiner* — Marc Norman
*Assistant Examiner* — Devon Russell
(74) *Attorney, Agent, or Firm* — Lerner, David, Littenberg, Krumholz & Mentlik, LLP

(57) ABSTRACT

A heat exchanger for an outer skin of an aircraft comprises at least one feed line for a coolant, at least one discharge line for the coolant and at least one bundle of coolant channels through which coolant flows, wherein in the case of the heat exchanger being attached to the outer skin, the coolant channels are positioned directly on the outer skin of the aircraft, at least in areas, for dissipating heat to the surrounding environment of the aircraft. The heat exchanger may comprise cooling fins around which air flows for increasing the heat dissipation.

15 Claims, 12 Drawing Sheets

(51) Int. Cl.
*F28F 1/00* (2006.01)
*F28D 21/00* (2006.01)

(56) References Cited

U.S. PATENT DOCUMENTS

| | | | | |
|---|---|---|---|---|
| 2,249,948 A | * | 7/1941 | Dornier | 244/57 |
| 2,447,486 A | * | 8/1948 | Burke, Jr. | 244/57 |
| 2,472,622 A | * | 6/1949 | Savard | 244/135 R |
| 2,499,736 A | | 3/1950 | Kleen | |
| 2,514,105 A | * | 7/1950 | Thomas | 244/134 B |
| 2,801,829 A | * | 8/1957 | Taylor | 165/44 |
| 3,013,641 A | * | 12/1961 | Compton | 428/178 |
| 3,126,718 A | * | 3/1964 | Flamand | 62/219 |
| 3,321,154 A | * | 5/1967 | Downs | 244/159.1 |
| 3,783,935 A | * | 1/1974 | Simmons et al. | 165/44 |
| 4,674,704 A | * | 6/1987 | Altoz et al. | 244/1 R |
| 4,739,823 A | | 4/1988 | Howard | |
| 4,819,720 A | | 4/1989 | Howard | 165/104.34 |
| 4,923,146 A | * | 5/1990 | Anthony | 244/117 A |
| 5,228,643 A | * | 7/1993 | Manda et al. | 244/134 B |
| 5,238,056 A | | 8/1993 | Scotti et al. | |
| 5,312,693 A | * | 5/1994 | Paul | 428/554 |
| 5,369,960 A | * | 12/1994 | Mueller et al. | 62/238.6 |
| 5,513,500 A | * | 5/1996 | Fischer et al. | 62/239 |
| 5,553,815 A | * | 9/1996 | Adams et al. | 244/134 R |
| 5,667,168 A | | 9/1997 | Fluegel | |
| 5,702,073 A | * | 12/1997 | Fluegel | 244/57 |
| 5,806,793 A | * | 9/1998 | Brossier et al. | 244/57 |
| 5,807,454 A | * | 9/1998 | Kawabe et al. | 156/214 |
| 6,658,881 B1 | * | 12/2003 | Plattner | 62/239 |
| 7,222,819 B1 | * | 5/2007 | Kelnhofer | 244/53 B |
| 7,506,838 B2 | * | 3/2009 | Porte | 244/53 B |
| 7,900,872 B2 | * | 3/2011 | Sternberger | 244/134 C |
| 7,946,806 B2 | * | 5/2011 | Murphy | 415/145 |
| 7,967,249 B2 | * | 6/2011 | Muhlthaler et al. | 244/118.5 |
| 8,161,755 B2 | | 4/2012 | Marche | |
| 2007/0120009 A1 | * | 5/2007 | Kelnhofer | 244/53 R |
| 2008/0302910 A1 | * | 12/2008 | Calamvokis | 244/118.5 |
| 2010/0132915 A1 | * | 6/2010 | Blanding | 165/41 |
| 2010/0236213 A1 | * | 9/2010 | Schilling | 60/39.08 |

FOREIGN PATENT DOCUMENTS

| | | |
|---|---|---|
| DE | 3824471 A1 | 2/1990 |
| DE | 102008035823 A1 | 2/2010 |
| EP | 0584733 A1 | 3/1994 |
| EP | 0655593 A1 | 5/1995 |
| FR | 887267 A | 11/1943 |
| JP | 64-061999 | 3/1989 |
| JP | 01-256775 | 10/1989 |
| JP | 03-025096 | 2/1991 |
| JP | 06-156392 | 6/1994 |
| JP | 2003110330 A * | 4/2003 |
| WO | 2005063569 A1 | 7/2005 |
| WO | 2007047386 A2 | 4/2007 |
| WO | 2008140972 A1 | 11/2008 |
| WO | 2010012684 A1 | 2/2010 |

* cited by examiner

Fig. 1a
Fig. 1b
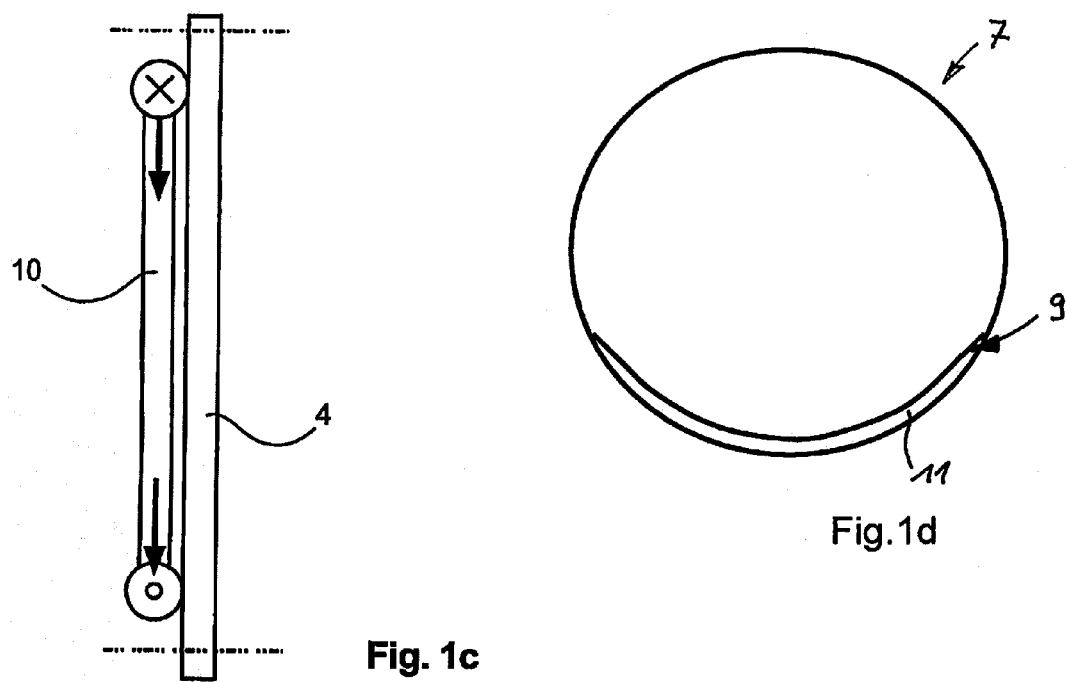
Fig. 1c
Fig. 1d

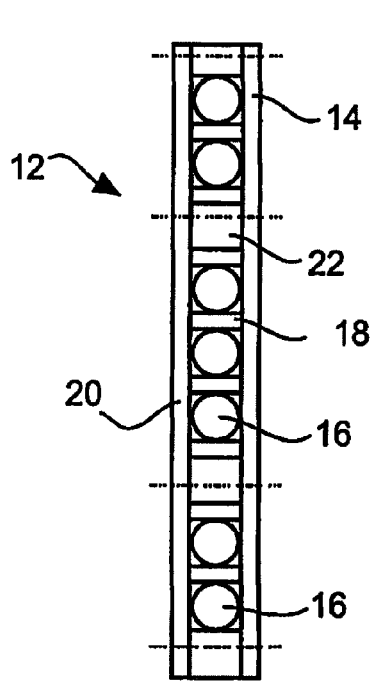
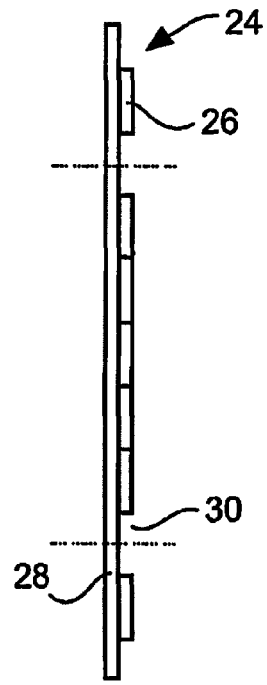
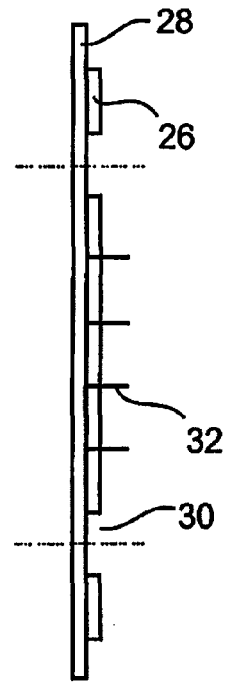
Fig. 2a   Fig. 2b   Fig. 2c
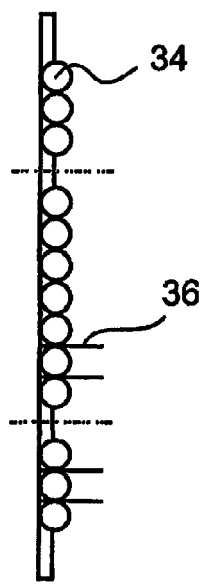
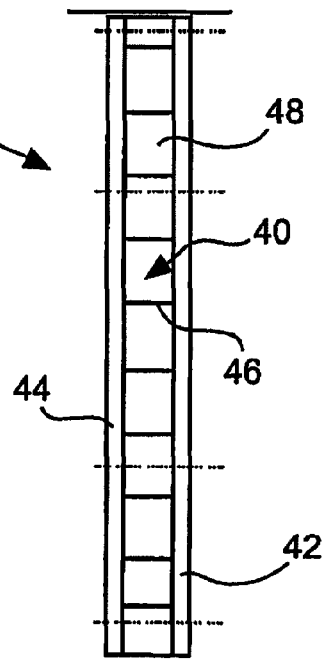
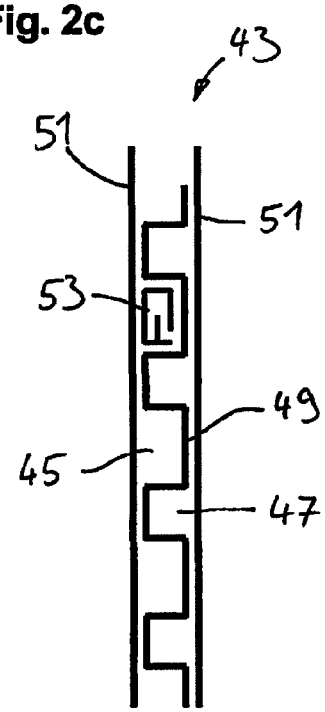
Fig. 2d   Fig. 2e   Fig. 2f

HEAT EXCHANGER FOR THE OUTER SKIN OF AN AIRCRAFT

RELATED APPLICATIONS

This application is a national phase entry under 35 U.S.C. §371 of International Application No. PCT/EP2009/059665, filed Jul. 27, 2009, published in German, which claims the benefit of the filing date of U.S. Provisional Patent Application No. 61/137,472, filed Jul. 31, 2008 and of German Patent Application Ser. No. 10 2008 035 823.1, filed Jul. 31, 2008, the entire disclosures of which are hereby incorporated herein by reference.

TECHNICAL FIELD

The invention relates to a heat transfer device for the outer skin of an aircraft, to a cooling system for an aircraft, to a use of a heat transfer device for the outer skin of an aircraft, as well as to an aircraft comprising at least one heat transfer device for the outer skin.

BACKGROUND OF THE INVENTION

In modern commercial aircraft there are various components that have certain cooling requirements. For example, environmental control systems require the supply or production of a cool medium in order to provide the best possible thermal comfort for passengers on board the aircraft, whereas, for example, a host of electronic devices and installations generate waste heat that has to be conveyed out of the aircraft. As a result of the increasing integration of electrical devices in aircraft increasingly cooling systems are installed that use liquid refrigerants for heat transfer. Such cooling systems are suitable for discharging relatively large quantities of air that can practically not be accumulated in an aircraft. Furthermore, in particular due to the very considerable demand for electrical power it would also be disadvantageous to eliminate such large quantities of heat by active cooling using refrigerating machines.

In industry, for example in the automotive sector in plant engineering and construction, and in the electronics industry, there exists a large variety of technical solutions and designs of heat transfer devices for cooling devices and other installations. The use of heat exchangers in aircraft is known, which heat exchangers convey their heat to the surroundings of the aircraft by way of the outer skin. This is described, for example, in EP 06 55 593 A1; however, the heat transfer device described therein is used in an active cooling system for foodstuffs, in which cooling system for the purpose of supporting other heat sinks additionally outer-skin heat exchangers can also be used. Due to the different operating conditions of a commercial aircraft, for example reflected in greatly varying ambient temperatures, the outer-skin heat exchanger disclosed is only suitable for additionally supporting a conventional active cooling system at very considerable temperature differentials when compared to the ambient air.

SUMMARY OF THE INVENTION

It is the object of the invention to propose a heat transfer device for the outer skin of an aircraft, which heat transfer device is suitable for emitting, to the ambient air, relatively large quantities of heat from devices and installations within the aircraft, without in the background depending on active cooling by vacuum or evaporative cooling units. Furthermore, it is the object of the invention to propose a cooling system for an aircraft, in which cooling system heat can be emitted as effectively as possible to the surroundings of the aircraft by way of a heat transfer device for the outer skin of the aircraft.

This object is met by a heat transfer device for an outer skin of an aircraft, comprising at least one supply line and at least one discharge line for a coolant and at least one bunch of coolant ducts through which coolant flows, wherein the coolant ducts for the purpose of emitting heat to the surroundings of the aircraft in the case of a heat transfer device attached to the outer skin of the aircraft are at least in some regions positioned directly on the outer skin of the aircraft.

The heat transfer device according to the invention aims to transfer heat as effectively as possible by way of a number of coolant ducts in direct contact with the outer skin of the aircraft. Preferably, the heat is transferred to the outer skin if at all possible without contact resistance, which equally means that it is not mandatory for the coolant ducts to comprise a closed surface, but instead they can also be open towards the outer skin. In this arrangement it would be advantageous if the hot fluid were directly in contact with the outer skin. Accordingly it is necessary for the coolant ducts at least in some regions to be positioned directly on an outer skin of the aircraft, so that they should be arranged in such a manner, on an attachment surface or on that side of the heat transfer device that is to be attached to the outer skin, that by attachment of the heat transfer device to the outer skin direct contact between the coolant ducts and the outer skin is established.

By corresponding dimensioning of the area taken up by the heat transfer device it is possible to discharge even large quantities of heat where there are relatively slight temperature differentials between the coolant and the air surrounding the aircraft, which is made possible by the particularly flat design. Depending on requirements, air-air heat transfer devices or liquid-air heat transfer devices as well as air-cooled condensers can be operated. The constructional and integrative requirements of a heat transfer device according to the invention are tailored to the particular conditions and requirements of aircraft so that the performance parameters that are important for optimum aircraft operation are influenced as little as possible. These are, in particular, the least-possible (additional) air resistance, low current consumption, light weight as well as modest requirements for installation space. This is met in that the coolant, which term incidentally is not limited only to liquid coolants, is led directly underneath the outer skin of the aircraft and, for example in the case of integration on the inside of the outer skin, results in only modest radial extension that does not impede other design elements in the interior of the aircraft. Minimum power consumption is due to an electrical pump for conveying the coolant through the heat transfer device according to the invention, which power consumption is, however, significantly lower than that of an electrical cooling system.

During flight operation the cooling effect takes place as a result of the ambient air that flows along the outer skin. For this reason the heat transfer device according to the invention would preferably be suitable for cooling electrical emergency systems, for example a fuel cell as an emergency energy system with a relatively large amount of waste heat. On the ground, the heat dissipation to the outside air is reduced so that in the least favourable case, when there is no wind, the heat dissipation would be reduced to the fraction of the free convection. In the case of waste heat from a fuel cell of, for example, 90° C. and a maximum outside temperature of approximately 50° C. on the ground, an adequate cooling effect would be achieved at the given temperature difference with the use of a heat transfer device that comprises an adequate area.

It should be pointed out that it is not mandatory for the coolant ducts to be separated from each other and to comprise a closed wall. The coolant ducts can either be provided by individual separate pipelines or the like, or by geometric delimitations in the form of webs and lamellae arranged thereon, and open regions that face the outer skin, as well as corresponding sealing required for this. In the latter case it can definitely be sensible for the individual coolant ducts to communicate with each other rather than conveying coolant completely separately and independently of each other.

A particularly advantageous embodiment of the heat transfer device according to the invention further comprises a housing for receiving the coolant ducts. However, in this context the term "housing" does not refer to a closed box-like object but rather to the spatial bringing together of several coolant ducts in a type of frame that could be closed off by a cover or the like.

In principle such closed off heat transfer devices may comprise a plate like construction that is similar or equal to that of a plate heat exchanger. In the following individual heat exchangers are referred to as "plate". A plate thereby consists of two outer surfaces, of which one outside surface is directing into the fuselage center and one outer surface is directing towards the surrounding of the aircraft. Hot fluid flows into the plate and is cooled by at least one outside surface of the plate element. The plate element comprises a surface structure on the outside that leads to a good heat conduction. There is a number of options for this, structures or webs may be installed for improving the heat conduction. These structures may be built up through embossing, metal forming or deep-drawing respectively, or milling. With an extruded plate structures may be installed directly during the manufacture, besides of cooling channels. In the inside of the plate element hot fluid is lead through channels, tubes or the such, for spreading the heat on the surface as uniformly as possible. Coolant channels may be arranged horizontally, in coils or in a spiral shape. The plate element may also consist of two plate halds that are connected to each other by glueing, soldering, welding, e.g. continuous roller welding. The plate may be connected thermally, e.g. through sintering of monolithic material. Webs that create deliberate swirls may be installed easier this way.

Particularly preferably the heat transfer device according to the invention is installed in the interior fuselage structure so as to be flush so that the fuselage structure in that region would have to be modified or interrupted. For this reason it is advantageous if the housing at least in some regions forms a load-bearing fuselage structure. In this way the already existing fuselage structure can be supplemented by the housing of the heat transfer device so that the mechanical characteristics of the fuselage structure are maintained.

Particularly preferably the housing comprises webs and at least one cover. In this context webs refer to sheet-like components that extend from the outer skin over the coolant ducts and can together be covered by a cover. As a result of the webs the mechanical strength of the housing is increased, and integration is facilitated.

In a particularly preferred embodiment of the heat transfer device according to the invention there is a gap between the cover and the coolant ducts, which heat transfer device for the purpose of allowing air to flow through it comprises at least one air inlet and at least one air outlet. In this way the heat emission of the coolant ducts can be further increased, because through-flowing air removes heat from the surface of the coolant ducts, which heat is not in contact with the outer skin. Consequently a more effective cooling system can be provided.

Furthermore, it is preferred if the heat transfer device according to the invention provides for cooling fins between the coolant ducts. At the positions at which they are in contact with the cooling fins the coolant ducts can also emit heat so that there is a further increase in the quantity of heat that can be emitted by the heat transfer device.

In a further preferred embodiment of the heat transfer device according to the invention the webs and/or cooling fins comprise vortex inducers and/or slots that are suitable for swirling air. This is advantageous because better heat transfer can be achieved by means of a turbulent flow.

In a preferred embodiment of the heat transfer device according to the invention the coolant ducts are arranged on the interior of the outer skin. This results in no additional air resistance being generated, and in the supply lines and discharge lines for the coolant being particularly easy to integrate. However, in this embodiment there is no direct contact between ambient air flowing past and the coolant ducts.

In a further preferred embodiment of the heat transfer device according to the invention the coolant ducts are arranged on the exterior of the outer skin. The aforesaid is to be designed such that the additional air resistance resulting from the heat transfer device arranged on the outside is as low as possible, while nevertheless good flow over the coolant ducts can be ensured. The previously-mentioned webs and cooling fins are possible for this embodiment too, but they are to be designed so that likewise the additional air resistance is minimised. With this embodiment of the cooling system according to the invention the quantity of air that can be emitted can be significantly increased.

Designing the coolant ducts at least in some regions as lines with an essentially round or angular cross section is advantageous because of easy production. In addition, care should be taken that the diameter, or the opening width respectively, of the lines should be selected to be as small as possible so as to save weight, because with the same pressures applied, lines with a relatively small cross section require significantly thinner walls than lines with larger cross sections. Many lines with a small cross section increase the surface and thereby provide for a higher potential for dissipating heat. At the same time it should be drawn attention tonot designing the cross sections of coolant ducts not too flat, since this would result in a higher curvature tendency during higher coolant pressures.

In a favourable variant of the heat transfer device according to the invention, coolant ducts with an angular cross section can be provided with a sandwich core that makes possible a multitude of individual ducts with relatively thin walls.

In an advantageous improvement of the heat transfer device the coolant ducts are realised as gaps between a heat receiving plate and a pressure bulkhead and/or an outer skin of the aircraft. This facilitates and improves the cooling through the heat transfer device according to the invention, since the use of air from the surroundings of the aircraft or from the passenger cabin is particularly easy. The invention is not limited to the use of a single plate, in fact larger stacks of plates with air gaps or the such inbetween may be used to still further improve the cooling power.

It is further advantageous if at least one slit is arranged in the outer skin of the aircraft for enabling an air flow from the surrounding of the aircraft into at least one gap. The drawing of cooling air thereby is practically unlimited. It is also possible to arrange and conduct a fluid mechanical design of a plurality of slits in a way that deliberately defined areas of the heat transfer device can be flown around by a dosed amount of cold air.

It is further beneficial to provide a blower for conveying air into or out of a gap for further enforcing the cooling.

Furthermore, for the creation of a free convection current it is sensible to arrange two vertically distanced slits in the outer skin of the aircraft. In a cold surrounding and low heat load a sufficient cooling can be achieved without further energy consumption.

Finally, it is sensible to orientate the slits parallel to the flight direction in order to reduce the aerodynamic flow losses.

The object of the invention is furthermore met by a cooling system with at least one closed coolant circuit and at least one heat transfer device according to the invention. Finally, the object is met by the use of a heat transfer device according to the invention according to the above-mentioned criteria and by an aircraft comprising at least one heat transfer device according to the invention.

SHORT DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

FIGS. 1a to 1d show a diagrammatic overview of the arrangement of a heat transfer device on the outer skin of an aircraft;

FIGS. 2a to 2f show possible variants of the heat transfer device;

Figure 5A:
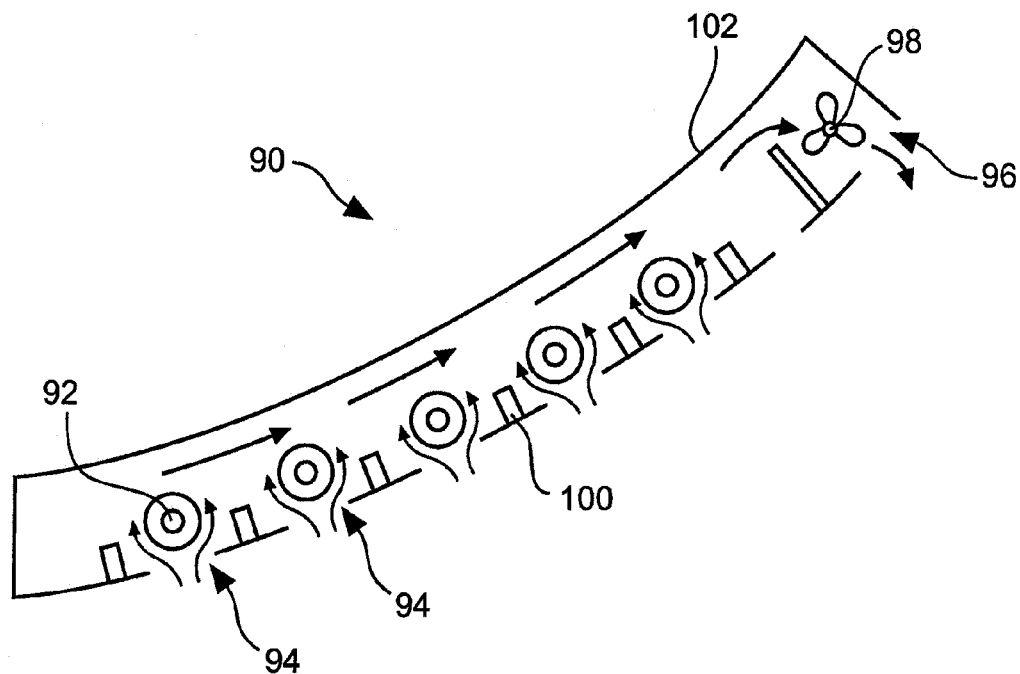

FIGS. 5a+5b show two further exemplary embodiments of a heat transfer device through which air flows in addition.

Figure 6:
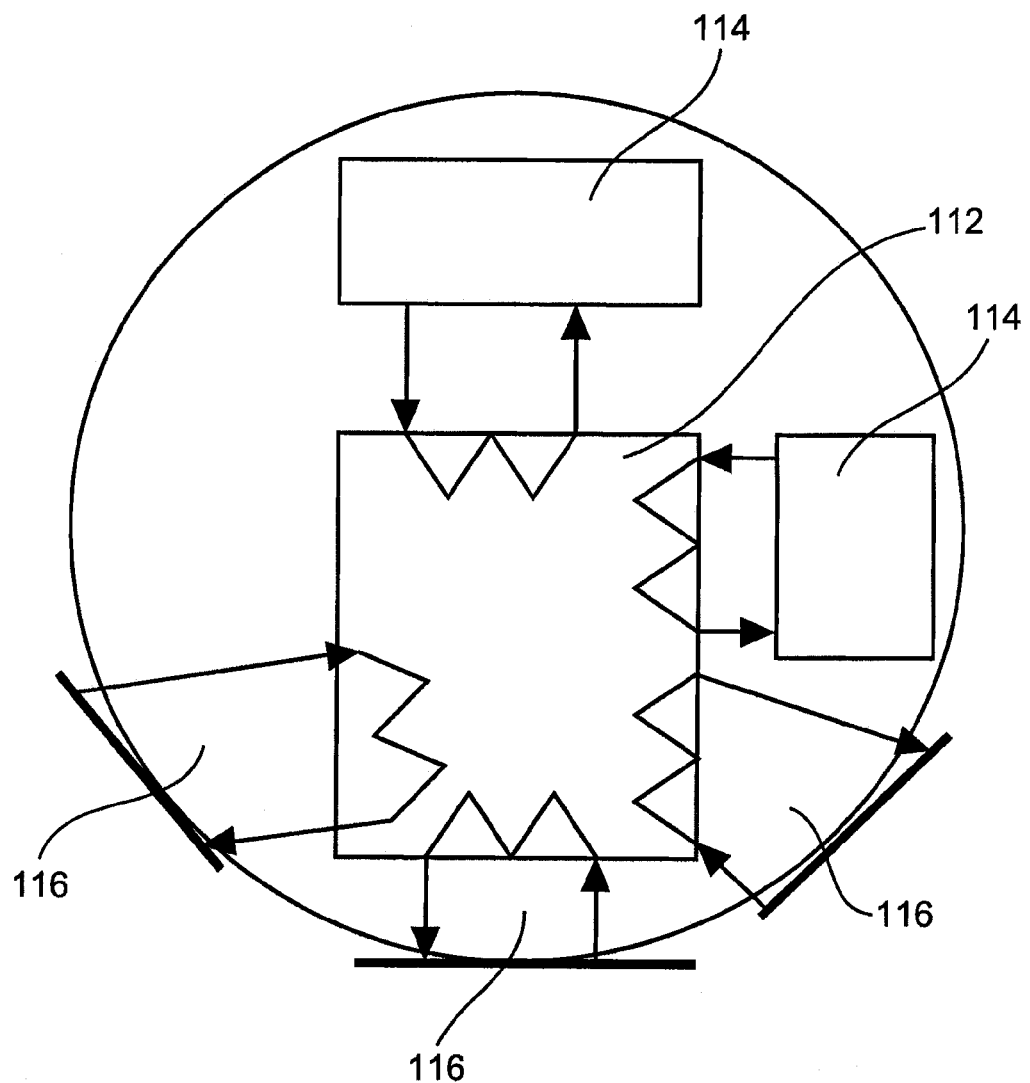
Figure 7A:
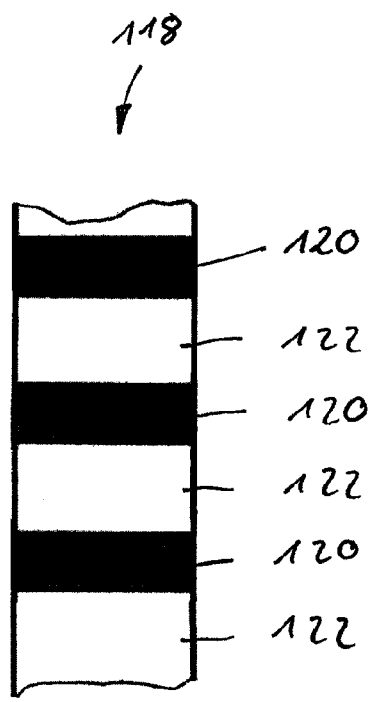
Figure 7B:
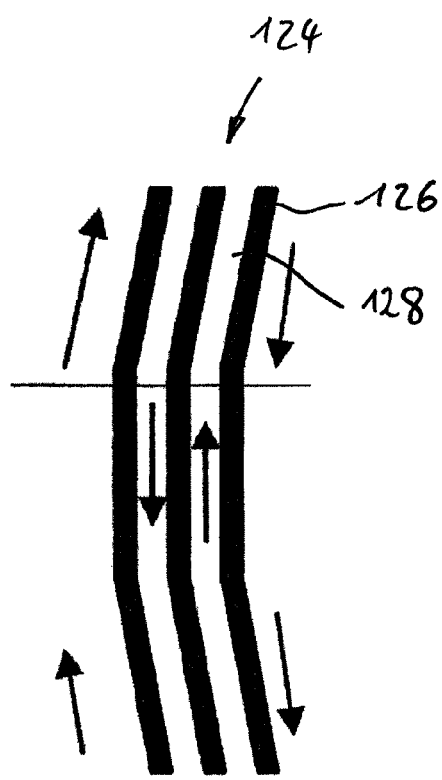

FIG. 6 shows a diagrammatic overall view of a cooling system according to the invention in an aircraft;

FIGS. 7a and 7b show sandwich like heat transfer devices with coolant ducts and air ducts in an alternating manner in diagrammatic views.

Figure 8:
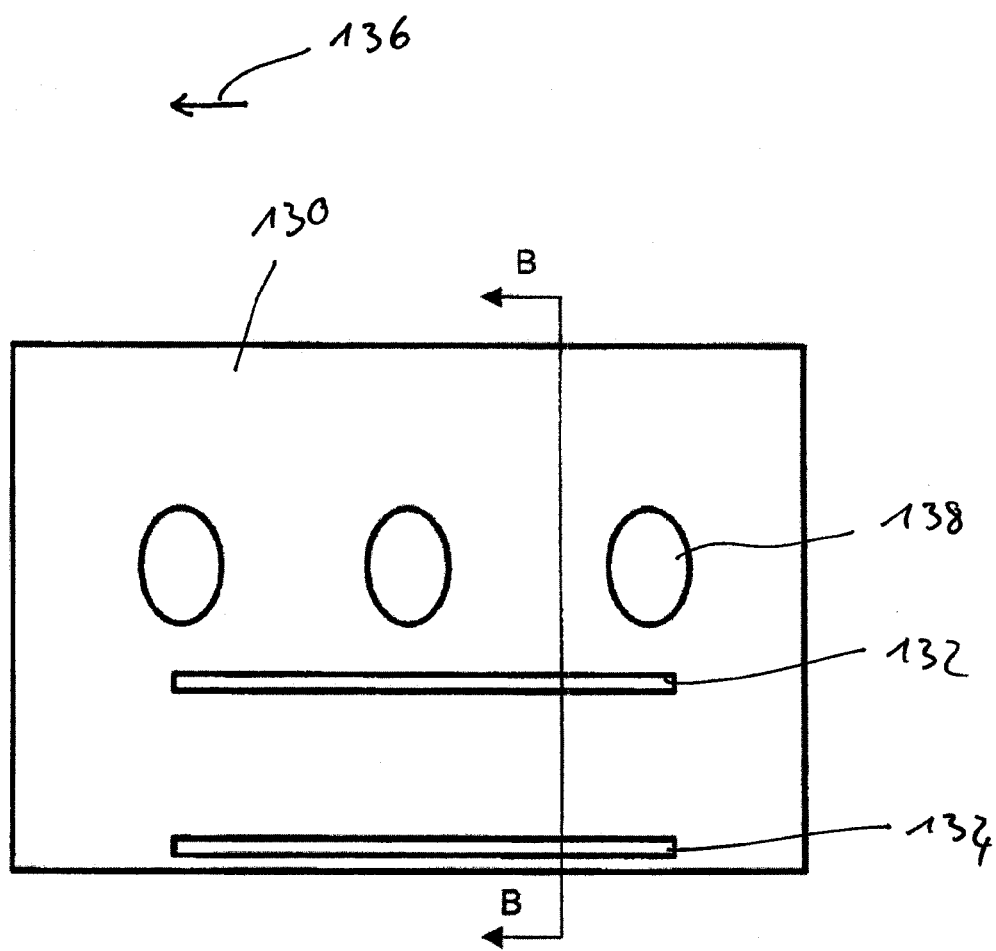

FIG. 8 shows a section of the outer skin of an aircraft with slits vor receiving of air outside air.

Figure 9:
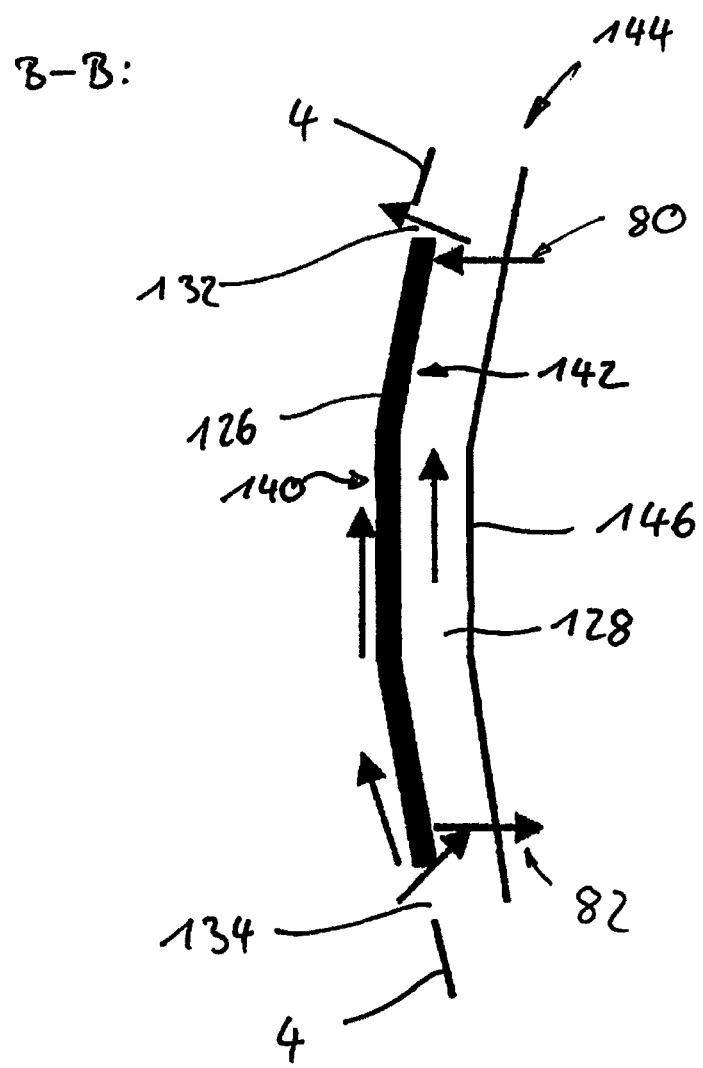

FIG. 9 shows an exemplary embodiment of a heat transfer device in a sectional view.

Figure 10:
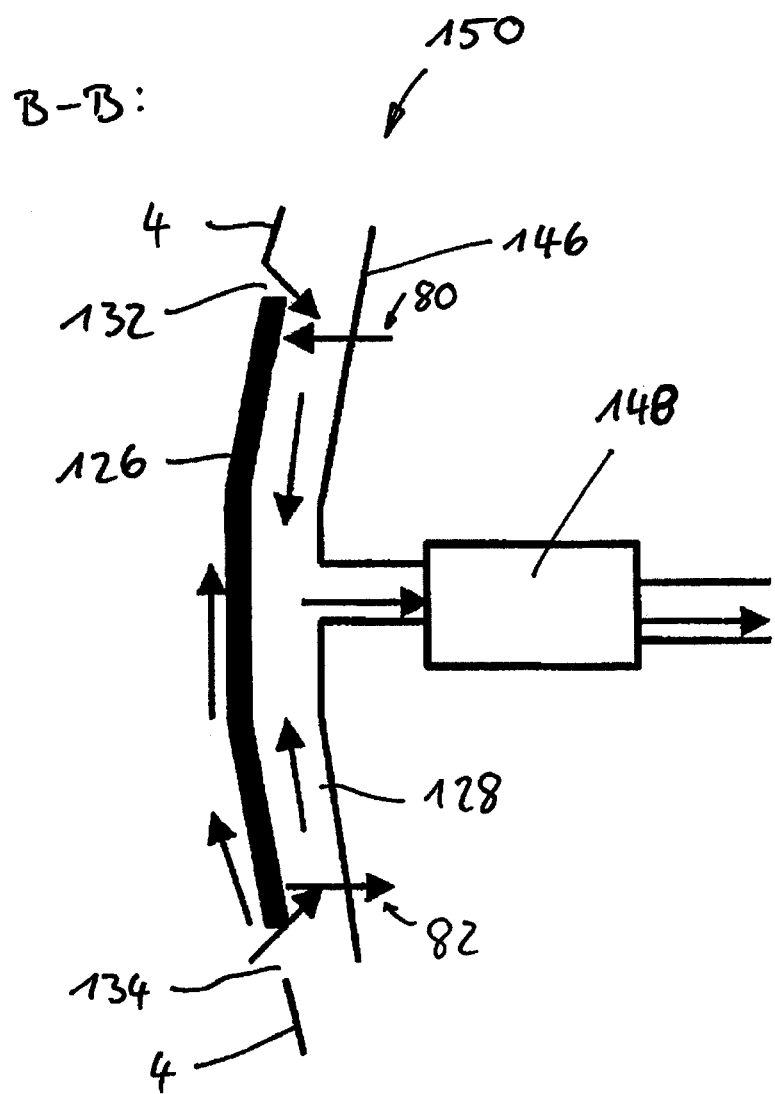

FIG. 10 shows an exemplary embodiment of a heat transfer device in a sectional view.

Figure 11:
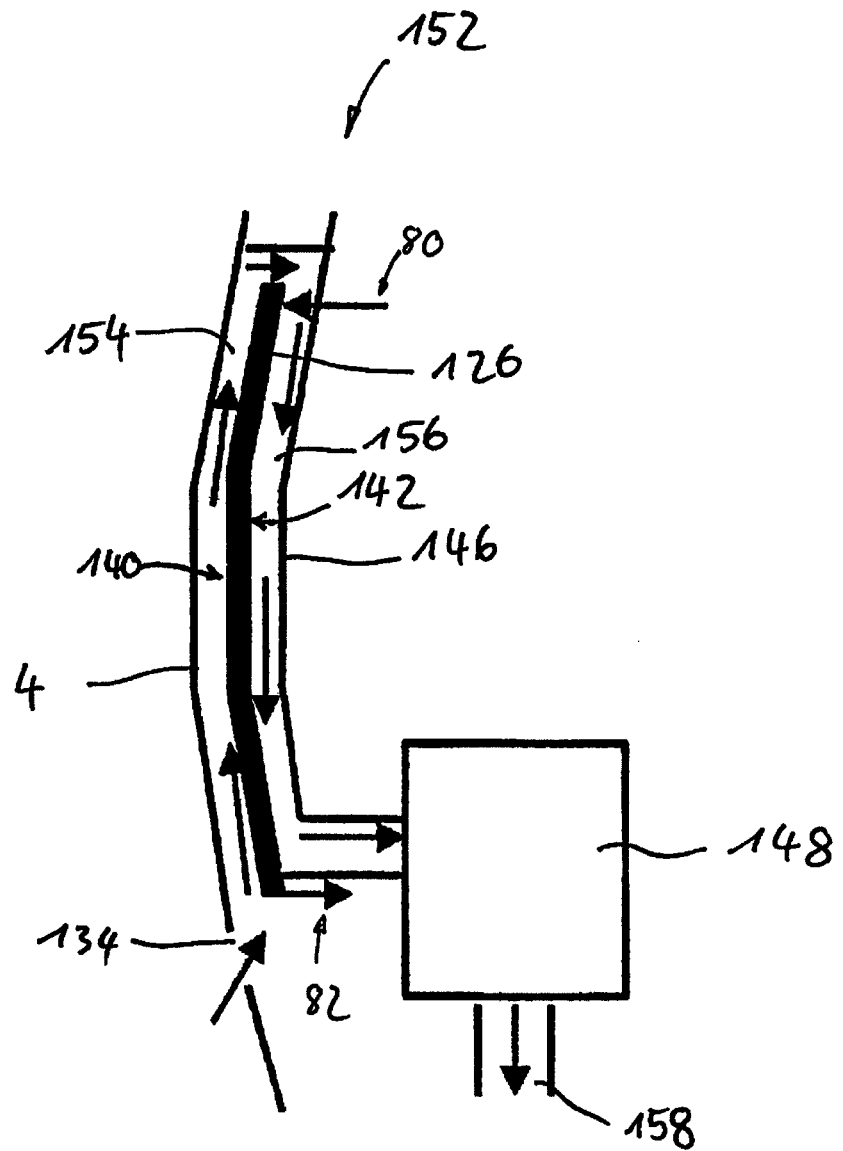

FIG. 11 shows an exemplary embodiment of a heat transfer device in a sectional view.

Figure 12:
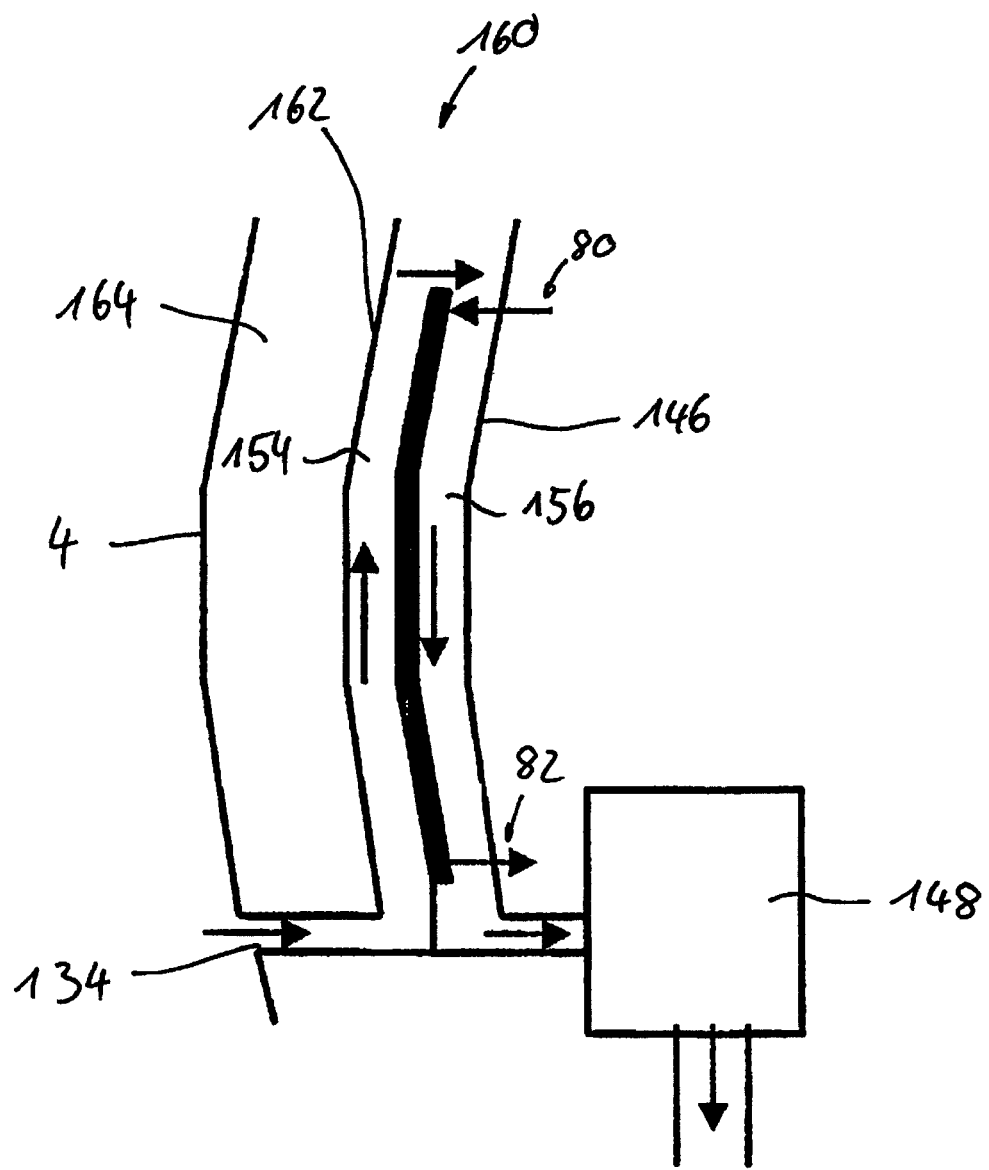

FIG. 12 shows an exemplary embodiment of a heat transfer device in a sectional view.

DETAILED DESCRIPTION OF EXEMPLARY EMBODIMENTS

FIG. 1a generally shows the manner in which a heat transfer device 2 can be arranged on the outer skin 4 of an aircraft. In this embodiment the heat transfer device 2 is arranged on the interior 6 of the aircraft, whereas in the embodiment of FIG. 1b the heat transfer device 2 is positioned on the exterior 8 of the aircraft. In these different installation positions it should be noted that the heat transfer device 2 has to meet different mechanical requirements. If the heat transfer device 2 is arranged on the interior 6 of the aircraft, in particular cases the heat transfer device 2 must be designed to absorb structural loads acting on the fuselage. In the case of relatively large-area heat transfer devices 2, which is not unrealistic in view of large quantities of heat without active cooling units, for flush installation of the heat transfer device 2 to the outer skin 4, in some regions the fuselage structure which exists in those locations and that comprises frame elements, stringers and other stiffening components needs to be modified or interrupted. For this reason it is necessary to mechanically close this gap through the heat transfer device 2. Accordingly, the heat transfer device 2 should comprise a housing or the like that is designed to completely absorb the locally arising loads.

Particularly for the dissipation of larger heat loads it may be sensible to modify the structure. For example, the lower part of a complete fuselage section 7 may be shortened by 10 mm to 25 mm in radial direction (radial indentation 9). The radial indentation 9 is then filled with a 10 to 25 mm thick heat transfer device 11 so that the resulting aircraft contour remains unchanged and no aerodynamic drag occurs. The load bearing structure and the outer skin of the aircraft remains unchanged, except the indentation. For maintenance and repair operation the outer skin heat transfer device may be desinged so as to be easily detachable. It would also be conceivable to fly without the heat transfer in certain situation since no rough contour transitions are necessary.

However, for a heat transfer device 2 according to the invention as shown in FIG. 1b there is a necessity to minimise the air resistance, because at relatively high flight speeds of approximately 0.8 Ma even small changes in the cross section of the aircraft can result in a noticeable increase in fuel. For this reason the heat transfer device 2 according to the invention should be designed so as to be aerodynamically smooth for the installation position shown in FIG. 1b. The edges being visible in FIG. 1b should be made aerodynamically smooth by corresponding fairings. The arrangement as depicted in FIG. 1b is particularly suitable for retrofitting existing aircraft or for retrofitting of test aircraft.

FIG. 1c shows a coolant duct 10 designed as a coolant line, which coolant duct 10 is arranged so as to be flush with the outer skin 4. As a result of the contact between the coolant duct 10 and the outer skin 4, thermal conduction between the coolant duct and the outer skin 4 can take place.

FIG. 2a shows a first exemplary embodiment of a heat transfer device 12 according to the invention. The heat transfer device 12 according to the invention comprises a carrier plate 14 on which a number of coolant ducts 16 designed as coolant lines are positioned. Between the coolant ducts 16 there are webs 18 that support a cover 20. Apart from its function as a mechanical component for taking up structural loads from the fuselage in combination with the webs 18, said cover 20 can also serve as a so-called "pressure bulkhead", which is required in particular if underneath the heat transfer device 12 according to the invention there are openings through the outer skin of the aircraft. As a result of the considerable pressure differential between the surroundings of the aircraft and the aircraft cabin during flight, without the cover 20 acting as a pressure bulkhead, air would continuously flow from the cabin to the environment. In order to fulfil this task it is possible to provide adequately dimensioned mechanical connections as well as adequate sealing between the cover 20 and the webs 18.

In order to attach the carrier plate to the outer skin, in some regions in the coolant ducts 16 that are arranged in a bunched manner, individual coolant ducts 16 can be omitted, as is, for example, indicated by reference character 22. In those places a screw connection or rivet connection or some other suitable attachment can take place.

In the embodiment shown, the coolant ducts 16 can comprise an essentially round cross section that results in the coolant ducts 16 being able to be dimensioned with a relatively thin wall thickness, because in circular cross sections no bulges occur, as would be the case, for example, in angular cross sections. The aim should be to use the largest possible number of coolant ducts 16, but to design them with a relatively small cross section. In this way the wall thickness of the coolant ducts 16 can be further reduced, as can the radial dimension of the heat transfer device 12 according to the invention. The number of coolant ducts 16 then depends on the necessary coolant mass flow. Line cross sections in the millimeter range, for example between 2 mm and 10 mm, appear to be realistic.

FIG. 2b shows a second exemplary embodiment of a heat transfer device 24 according to the invention, in which a multitude of angular coolant ducts 26 are positioned on a carrier plate 28. The opening width of the coolant ducts 26 should be selected so that it is not too wide, because the pressure load resulting from the coolant pumped into the coolant ducts 26 could result in bulging. Therefore in this exemplary embodiment, too, the number of coolant ducts 26 should be selected to be relatively large so that the wall thicknesses can be designed so as to be relatively thin. This exemplary embodiment, too, between the coolant ducts 26, can comprise recesses 30 for attaching the carrier plate 28 to the outer skin of the aircraft.

FIG. 2c shows a modification of the heat transfer device 24 according to the invention from FIG. 2b, which heat transfer device 24 additionally comprises cooling fins 32 that are arranged between the coolant ducts 26.

FIG. 2d analogously to FIG. 2c shows an arrangement of coolant ducts 34 in which at least in some regions cooling fins 36 are arranged between two adjacent coolant ducts 34.

In FIG. 2e the implementation of a heat transfer device 38 according to the invention through a sandwich panel is presented. The sandwich panel 40 is located on a carrier plate 42 and is covered by a pressure bulkhead 44. In the sandwich panel 40 there is a relatively large number of large walls 46 that form the individual coolant ducts 48.

Finally, FIG. 2f shows a design of air ducts 45 and 53 that is easy to implement, and a coolant duct (hot fluid) 47. The ducts could be produced from a corrugated iron sheet 49 and cover sheets 51 arranged so as to adjoin. These three sheets 51 could, for example, be produced from a steel foil 0.25 mm in thickness and could be soldered or welded (e.g. roller seam welding). A design comprising aluminium, titanium or even plastic is also imaginable. In the air duct 45 a cooling fin comprising a sheet which is approximately 0.05 mm in thickness or swirling bodies 53 for swirling air in order to increase the heat transfer could be arranged. In this arrangement, for example, a u-shaped foil segment with protruding foil sections is suitable.

Figure 3:
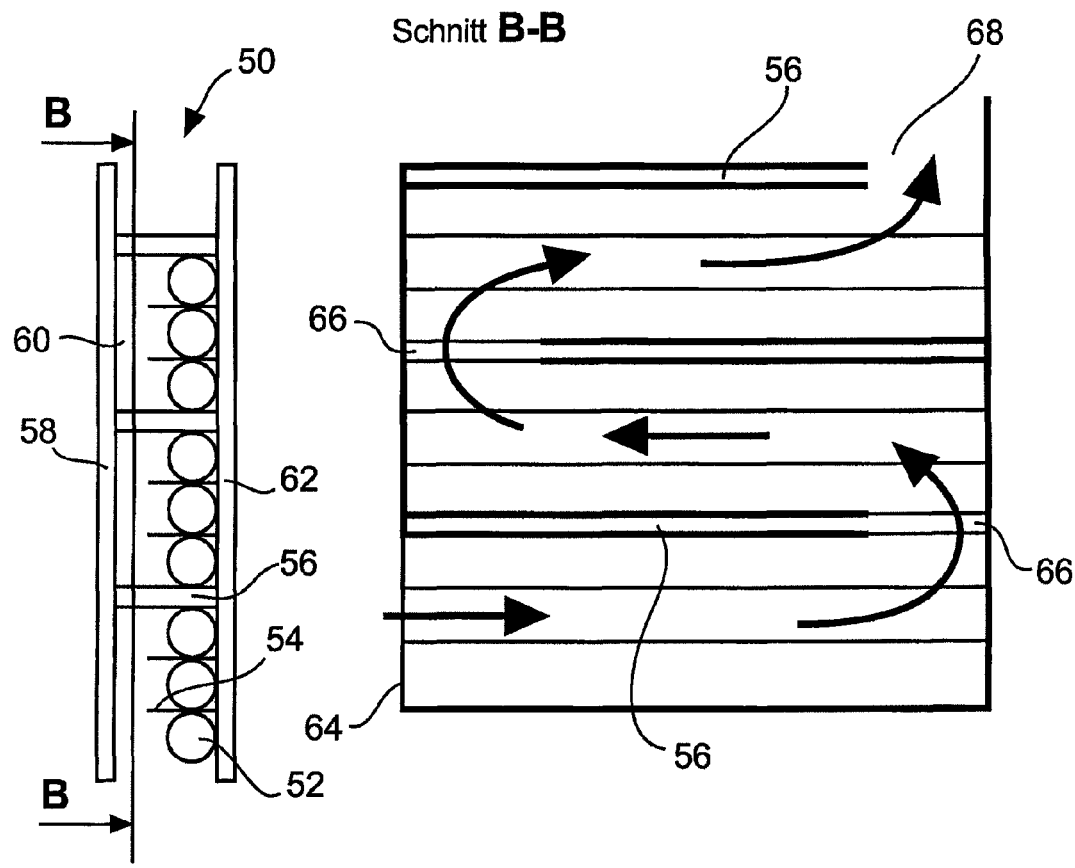
FIG. 3 shows a diagrammatic view of a heat transfer device through which air flows in addition.

FIG. 3 shows a particular exemplary embodiment of a heat transfer device 50 according to the invention, in which the advantages of the preceding exemplary embodiments are combined. For example, the heat transfer device 50 according to the invention comprises several coolant ducts 52, between which individual cooling fins 54 are positioned. In the case shown in FIG. 3, in each case three coolant ducts 52 form a group, with each group being separated by a web 56. The webs 56 are dimensioned in such a manner that a gap 60 forms between the coolant ducts 52 and a cover 58. The cover 58 together with the webs 56 and a carrier plate 62 form a housing, wherein the carrier plate 62 can also be the outer skin of the aircraft. As an example, FIG. 3 shows the manner in which air can flow through the heat transfer device 50 according to the invention over the coolant ducts 52. By way of an air inlet 64, air is conveyed into the interior of the heat transfer device 50 and flows around the webs 56, which comprise offset openings 66 to form a labyrinth-like flow duct. Finally, the air flows from the air outlet 68, for example into the surroundings of the aircraft. In some sections the air flow is in the same direction as the flow of the coolant (co-flow), while in other sections it flows in the opposite direction (counter-flow), or it makes a transition from co-flow to counter-flow with an additional lateral flow component. By means of this arrangement, as shown, of the heat transfer device 50 according to the invention, the cooling effect takes place by means of thermal conduction between the coolant ducts 52 and the outer skin or the carrier plate 62 as well as by means of the airflow along the coolant ducts 52 and the cooling fins 54. In order to reinforce the cooling effect it is, for example, possible for the ribs to comprise vortex inducers and/or openings by means of which passing air is swirled. Swirled or turbulent airflow has a heat transfer coefficient so that heat emission in this region could be improved.

Figure 4A:
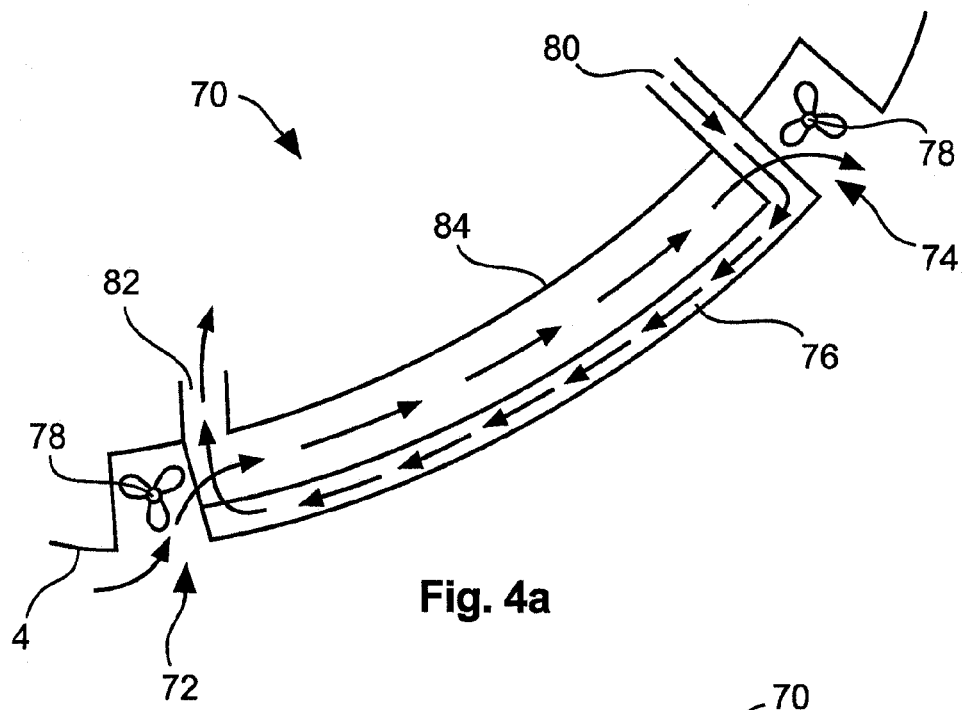
FIGS. 4a and 4b show a diagrammatic view of a heat transfer device through which air flows in addition, in its installed state.

A heat transfer device 70 according to the invention, which heat transfer device 70 is shown in FIG. 4a, comprises an air inlet 72 and an air outlet 74 through which air from the surroundings of the aircraft can flow in. The air moves over coolant ducts 76 and leaves the aircraft fuselage through the air outlet 74. In order to improve performance, blowers 78 can be used, which are advantageous in particular when the aircraft is situated on the ground and when there is no airflow. The coolant is conveyed into the coolant duct 76 through a supply line 80 and leaves said coolant duct 76 through a discharge line 82. The flow of coolant takes place, for example, in opposite direction to the airflow (counter-flow); however, the heat transfer device according to the invention is not limited to this, instead in this exemplary embodiment the same flow directions may be provided if required or desired. Due to the openings 72 and 74 in the outer skin 4 of the aircraft it is necessary for the heat transfer device 70 according to the invention to comprise a pressure bulkhead 84. In this way air can be prevented from discharging from the cabin to the surroundings of the aircraft.

Figure 4B:
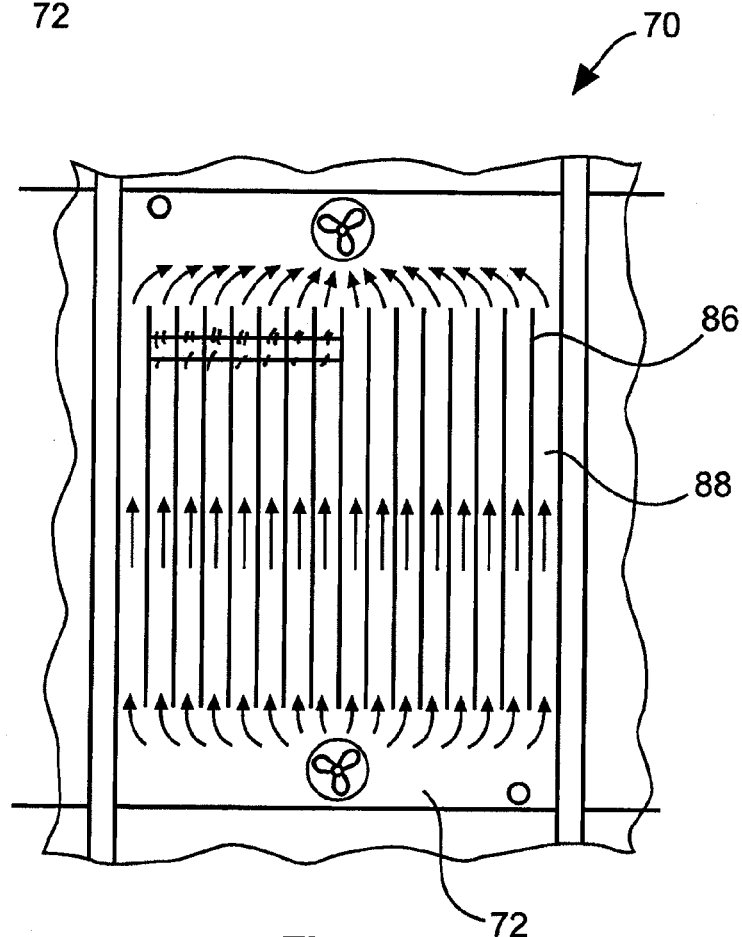

FIG. 4b in a top view of the heat transfer device 70 according to the invention shows an option of optimising heat transfer. To this effect there are cooling fins 86 between individual coolant ducts 88, around which cooling fins 86 air from the air inlet 72 flows. Furthermore, swirling the through-flowing air is sensible in order to improve heat transfer, wherein such swirling can take place by way of the already described vortex inducers or openings.

FIG. 5a shows a further exemplary embodiment of a heat transfer device 90 according to the invention which comprises several coolant ducts 92, designed as finned tubes, around which coolant ducts 92 inflowing air from air inlets 94 flows in the manner of a cross-flow. After flowing around the coolant ducts 92 the inflowing air leaves the heat transfer device 90 according to the invention through the air outlet 96. As already described above, in this embodiment, too, a blower 98 can be arranged in the region of the air outlet 96 in order to improve the cooling performance. In FIG. 5a, between the coolant ducts 92, there are longitudinal stiffening components 100, also known as stringers, which are used to provide longitudinal stiffness to the fuselage. Due to the multitude of air inlets 94 in the outer skin 4 of the aircraft, in this exemplary embodiment, too, it is necessary for a pressure bulkhead 102 to prevent air flowing out from the cabin to the surroundings.

Figure 5B:
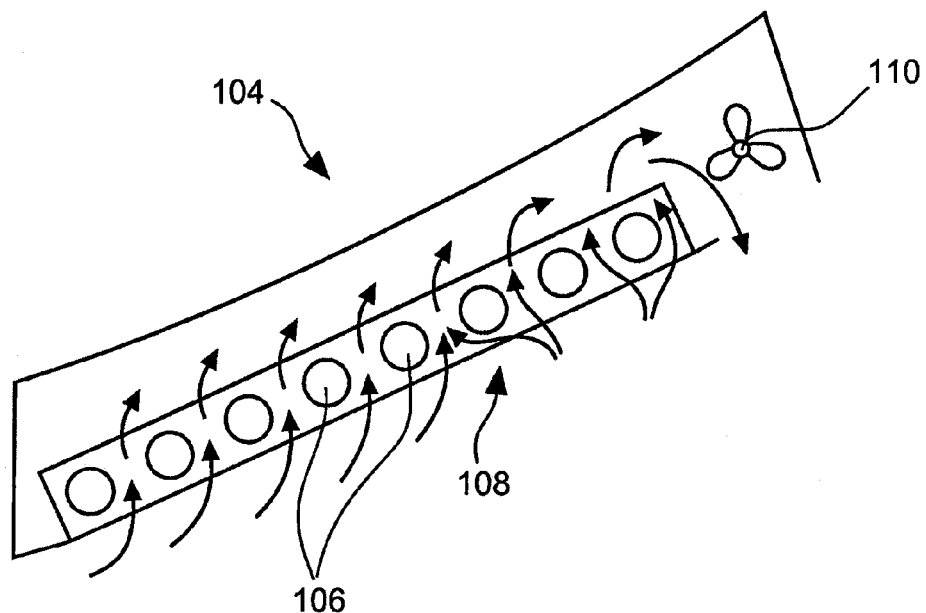

Finally, FIG. 5*b* presents a further example of a heat transfer device 104 in which air flows around coolant ducts 106 in the form of a finned radiator 108 installed in the outer skin of the aircraft. If required, the finned radiator 108 is supported by an additional blower 110.

As shown in FIG. 6, it is particularly advantageous if in the cooling system according to the invention the integration of a collective heat transfer device 112 is implemented in a liquid/liquid design, wherein this design is suitable for absorbing heat from one or several heat sources 114, and equally for emitting said heat to one or several heat transfer devices 116. This design is very effective because even heat sources with greatly differing waste heat quantities and with high or low waste heat temperatures can emit their heat to the liquid mass present in the collective heat transfer device 112. This ensures that the capacity of several heat transfer devices 116 present in an aircraft can be use evenly. This obviates the need to provide a dedicated heat transfer device for each device that produces particularly large quantities of heat.

The following figures show integration examples for heat transfer devices according to the invention in aircraft, which heat transfer devices are all designed according to the principles stated above.

FIG. 7*a* further shows a diagrammatic view of a heat transfer device 118 in which ducts 120 for heated fluid and ducts 122 for cold fluid alternate. In this arrangement the design could essentially correspond to the design of the heat transfer device 38 from FIG. 2*e*. If in the duct for cold fluid air is conveyed, the integration of additional cooling fins would also be sensible. In addition, heat is discharged by way of the external limiting surfaces. The width of this heat transfer device could range from 10 to 25 mm.

FIG. 7*b* shows a further heat transfer device 124 in which several plates 126 are arranged side by side so that air gaps 128 form. In or on each plate 126 hot fluid is conveyed, e.g. in ducts. On the sides of the respective plates 126 fluid can flow along for heat transfer, preferably in such a manner that each plate 126 is in contact with cold and heated fluid, wherein the cold fluid and the heated fluid can have a direction of flow that is opposite to each other. Below, for reasons of simplification a heat transfer device according to FIG. 7*b* is always shown with only one plate 126, wherein this is not to be interpreted as a limitation.

FIG. 8 has been provided to clarify the following sectional views. Part of an outer skin 130 of an aircraft is shown which part comprises two air slits 132 and 134 arranged parallel to each other, which air slits 132 and 134 extend in the direction of flight 136 of the aircraft. Purely as an example, the slits 132 and 134 are just below windows 138, but they can just as well be arranged at other locations in the aircraft. The slits 132 and 134 are preferably only a few millimeters wide, for example 15 mm. Due to the longitudinal alignment of the slits along the fuselage the aerodynamic flow losses of the aircraft are negligible.

FIG. 9 shows air guidance caused by free convection, on radial limiting surfaces 140 and 142 of a rear-ventilated plate 126 that is aligned so as to be flush with the outer skin 4 and at its top and bottom is separated from the outer skin by the slits 132 and 134. On the side of the plate 126 with the limiting surface 142, which plate faces the fuselage interior, there is a gap 128. During flight, heat is discharged through as a result of external skin friction of the air, which friction is present anyway. On the ground, cooling is supported by free convection on the limiting surfaces 140 and 142. To support the free convection, the gap 128 could have a depth of at least 10 mm, wherein the plate 126 could, for example, comprise a thickness of 5 mm. A heat transfer device 144 formed by the structure shown is closed off towards the interior of the aircraft in a pressure-proof manner by a pressure bulkhead 146.

However, with free convection the heat dissipation is very limited. At cool locations and with a light heat load to be dissipated this form of cooling may be sufficient. However, a far greater cooling effect can be achieved by forced convection. In this context FIG. 10 shows a modified design of the heat transfer device 144 which comprises a blower 148 for moving air in the air gap 128, which supports, in particular, cooling during operation on the ground. The electricity necessary for operating the cooling device could be provided by a fuel cell or by a ground supply. The fuel cell suggests itself in particular if the heat transfer device according to the invention is used for cooling a fuel cell.

In the case of forced convection the gap 128 might also be smaller than 10 mm, depending on the length of the airway. The arrangement of the blower 148 can implement both air supply and air suction. By means of the exemplary embodiment shown of a heat transfer device 150, cooling continues to be possible in flight and free convection continues to be possible on the ground on the limiting surface 140 that is arranged so as to be flush with the outer skin 4.

FIG. 11 shows enforced air guidance on the limiting surfaces 140 and 142 on a heat transfer device 152 with a single gap 134. In this arrangement, cooling is achieved exclusively by the blower 148. During flight, air can be moved through gaps 154 and 156 when the blower 148 is inoperative, which gaps 154 and 156 are situated between the plate 126 and the outer skin 4 or the pressure bulkhead 146 when the pressure present at the gap 134 exceeds the pressure present at an air outlet 158. If ventilation on the ground is desired, the air outlet 158 must be arranged above the gap 134. The cooling effect is very good with the use of the heat transfer device 152 according to the invention, and thus is particularly suitable for operation on the ground.

Finally, FIG. 12 shows a further exemplary embodiment of a heat transfer device according to the invention, which heat transfer device comprises a single slit 134 in the outer skin 4. This exemplary embodiment comprises a distinctive feature in that during operation of the blower 148 the best-possible cooling is achieved on an inside 162 of a frame element 164. The heat transfer device need not be integrated on an outside of frame elements 164. it can also be integrated in the aircraft on insides 162 of frame elements 164 or between the frame elements 164.

Furthermore, it would be imaginable to integrate the heat transfer device 160 in a floor of a passenger cabin, and in this way at the same time at high flight altitudes to heat up cold regions (the cargo space situated beneath the passenger cabin and the like). In this way a large a large area opens up with little influence on the design space. This presupposes a corresponding stability and tightness by way of the pressure bulkhead 146 in the pressurised region. This does not require any modification of the structure of the aircraft, which modification might, for example, lead to reconfiguration of frame elements and the like.

In relation to the exemplary embodiments of FIGS. 7*a* to 12 it should be pointed out that the means for spatially delimiting the respective heat transfer device are to be understood as a housing, so that this housing is formed, for example, by the outer skin and the pressure bulkhead as well as by further elements required to provide a tight seal. Furthermore, these exemplary embodiments, too, comprise at least to some extent a load-bearing function. Of course, all the gaps could also comprise cooling fins and the like in order to still further improve cooling.

All the exemplary embodiments are suitable for arrangement on free skin fields between frame elements and stringers of an aircraft fuselage. Likewise, it is also imaginable for the exterior diameter of frame elements to be altered in such a manner that the heat transfer devices can be arranged between the outsides of the frame elements and the outer skin of the aircraft.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

REFERENCE CHARACTERS

2 Heat transfer device
4 Outer skin
6 Interior
7 Fuselage section
8 Exterior
9 Radial indentation
10 Coolant duct
11 Heat transfer device
12 Heat transfer device
14 Carrier plate
16 Coolant duct
18 Web
20 Cover
22 Recess for attaching the heat transfer device
24 Heat transfer device
26 Coolant duct
28 Carrier plate
30 Recess for attaching the heat transfer device
32 Cooling fin
34 Coolant duct
36 Cooling fin
38 Heat transfer device
40 Sandwich panel
42 Carrier plate
43 Heat transfer device
44 Pressure bulkhead
45 Air duct
46 Wall
47 Coolant duct
48 Coolant duct
49 Corrugated iron sheet
50 Heat transfer device
51 Cover sheet
52 Coolant duct
53 Cooling fin or swirling bodies
54 Cooling fin
56 Web
58 Cover
60 Gap
62 Carrier plate
64 Air inlet
66 Opening
68 Air outlet
70 Heat transfer device
72 Air inlet
74 Air outlet
76 Coolant duct
78 Blower
80 Supply line
82 Discharge line
84 Pressure bulkhead
86 Cooling fins
88 Coolant duct
90 Heat transfer device
92 Coolant duct
94 Air inlet
96 Air outlet
98 Blower
100 Stringer
102 Pressure bulkhead
104 Heat transfer device
106 Coolant duct
108 Finned radiator
110 Blower
112 Collective heat transfer device
114 Heat source
116 Heat transfer device
118 Heat transfer device
120 Duct
122 Duct
124 Heat transfer device
126 Plate
128 Gap
130 Outer skin
132 Slit
134 Slit
136 Direction of flight
138 Window
140 Limiting surface
142 Limiting surface
144 Heat transfer device
146 Pressure bulkhead
148 Blower
150 Heat transfer device
152 Heat transfer device
154 Gap
156 Gap
158 Air outlet
160 Heat transfer device
162 Inside of frame element
164 Frame element

The invention claimed is:
1. A heat transfer device for an outer skin of an aircraft, comprising:
at least one supply line for a coolant;
at least one discharge line for the coolant;
at least one bundle of coolant ducts through which the coolant flows;
at least one gap between the coolant ducts and at least one of a pressure bulkhead, the outer skin of the aircraft, or a cover of a housing for receiving the coolant ducts; and
at least one slit in the outer skin of the aircraft for enabling an air flow from the surroundings of the aircraft into the at least one gap, the at least one slit comprising first and second slits arranged at a distance from one another and parallel to one another and parallel to the flight direction, wherein the heat transfer device is attached to the outer skin of the aircraft and the coolant ducts are positioned directly on at least some regions of the outer skin of the aircraft for dissipating heat to the surrounding environment of the aircraft.

2. The heat transfer device of claim 1, further comprising the housing for receiving the coolant ducts.

3. The heat transfer device of claim 2, wherein the housing forms a load-bearing fuselage structure at least in some regions thereof.

4. The heat transfer device of claim 2, wherein the housing comprises webs and at least one cover.

5. The heat transfer device of claim 4, wherein there is the gap between the cover and the coolant ducts, the gap comprising at least one air inlet and at least one air outlet for the purpose of allowing air to flow therethrough.

6. The heat transfer device of claim 1, further comprising one or more cooling fins arranged between the coolant ducts.

7. The heat transfer device of claim 6, wherein at least one of webs of the cover or the cooling fins comprise at least one of vortex inducers or openings for swirling air flowing therethrough.

8. The heat transfer device of claim 1, wherein the coolant ducts are arranged on an interior of the outer skin.

9. The heat transfer device of claim 1, wherein the coolant ducts are arranged on an exterior of the outer skin.

10. The heat transfer device of claim 1, wherein at least some regions of coolant ducts comprise lines having a substantially round cross section or a substantially angular cross section.

11. The heat transfer device of claim 1, wherein the coolant ducts are provided in a sandwich core.

12. The heat transfer device of claim 1, further comprising a blower for conveying air into or out from the at least one gap.

13. A cooling system for an aircraft, comprising at least one closed coolant circuit and at least one heat transfer device, the heat transfer device comprising:
- at least one supply line for a coolant;
- at least one discharge line for the coolant;
- at least one bundle of coolant ducts through which the coolant flows;
- at least one gap between the coolant ducts and at least one of a pressure bulkhead, the outer skin of the aircraft, or a cover of a housing for receiving the coolant ducts; and
- at least one slit in the outer skin of the aircraft for enabling an air flow from the surroundings of the aircraft into the at least one gap, the at least one slit comprising first and second slits arranged at a distance from one another and parallel to one another and parallel to the flight direction,
- wherein, the heat transfer device is attached to the outer skin of the aircraft and the coolant ducts are positioned directly on at least some regions of the outer skin of the aircraft for dissipating heat to the surrounding environment of the aircraft.

14. The cooling system of claim 13, further comprising a collective heat transfer device for absorbing heat from one or more heat sources and for emitting heat to the at least one heat transfer.

15. An aircraft comprising at least one heat transfer device comprising:
- at least one supply line for a coolant;
- at least one discharge line for the coolant;
- at least one bundle of coolant ducts through which the coolant flows;
- at least one gap between the coolant ducts and at least one of a pressure bulkhead, the outer skin of the aircraft, or a cover of a housing for receiving the coolant ducts; and
- at least one slit in the outer skin of the aircraft for enabling an air flow from the surroundings of the aircraft into the at least one gap, the at least one slit comprising first and second slits arranged at a distance from one another and parallel to one another and parallel to the flight direction,
- wherein, the heat transfer device is attached to the outer skin of the aircraft and the coolant ducts are positioned directly on at least some regions of the outer skin of the aircraft for dissipating heat to the surrounding environment of the aircraft.

\* \* \* \* \*